US010717143B2

(12) United States Patent
Nagai et al.

(10) Patent No.: US 10,717,143 B2
(45) Date of Patent: Jul. 21, 2020

(54) VAPOR-PHASE TYPE HEATING METHOD AND VAPOR-PHASE TYPE HEATING APPARATUS

(71) Applicant: Panasonic Intellectual Property Management Co., Ltd., Osaka (JP)

(72) Inventors: Koichi Nagai, Kyoto (JP); Tomoyasu Murakami, Osaka (JP); Naofumi Hino, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 125 days.

(21) Appl. No.: 15/950,223

(22) Filed: Apr. 11, 2018

(65) Prior Publication Data

US 2018/0345397 A1    Dec. 6, 2018

(30) Foreign Application Priority Data

May 30, 2017    (JP) ................................. 2017-106693

(51) Int. Cl.
 *B23K 1/015*  (2006.01)
 *H05B 1/02*  (2006.01)
 (Continued)

(52) U.S. Cl.
 CPC .............. *B23K 1/015* (2013.01); *F28F 23/00* (2013.01); *F28F 27/00* (2013.01); *H05B 1/0227* (2013.01)

(58) Field of Classification Search
 CPC ......... B23K 1/015; B23K 1/008; F28F 27/00; F28F 27/02; H05K 3/3494; F27B 17/0016; F27D 7/02; F27D 7/04; F27D 7/06
 See application file for complete search history.

(56) References Cited

U.S. PATENT DOCUMENTS 4,612,712 A * 9/1986 Pescatore ................ F28C 3/005
                                                    118/61
4,628,616 A * 12/1986 Shirai .................... B23K 1/015
                                                    134/11
(Continued)

FOREIGN PATENT DOCUMENTS

JP    2-080168    3/1990
JP    2-112871    4/1990
(Continued)

*Primary Examiner* — Gregory A Wilson
(74) *Attorney, Agent, or Firm* — Wenderoth, Lind & Ponack L.L.P.

(57) ABSTRACT

A vapor-phase type heating method includes: collecting, in the vapor tank, the heat transfer liquid which has come into contact with a heating target object, has cooled to liquefy, and has fallen down as droplets from a front surface of the heating target object to a lower portion of a heating furnace; resupplying, to the heating furnace, heated gas to which the vapor has been supplied and which has been formed by supplying the vapor from the vapor tank to heated gas obtained from heating the heating target object discharged from the heating furnace to a circulation pathway; and heating the heating target object, at a predetermined rate of temperature rise in a state of an even distribution of the vapor of the heat transfer liquid by maintaining the vapor of the heat transfer liquid in a predetermined amount in the heating furnace by the collection and the supply.

8 Claims, 9 Drawing Sheets

(51) Int. Cl.
  *F28F 23/00* (2006.01)
  *F28F 27/00* (2006.01)

(56) References Cited

U.S. PATENT DOCUMENTS

| | | | |
|---|---|---|---|
| 5,102,028 A | | 4/1992 | Glovatsky et al. |
| 5,146,694 A | * | 9/1992 | Mishina ............... B23K 1/015 118/61 |
| 5,156,325 A | * | 10/1992 | Mishina ............... B23K 1/015 228/219 |
| 5,333,774 A | * | 8/1994 | Mishina ............... B23K 1/015 228/46 |
| 5,542,596 A | * | 8/1996 | Cimbak ............... B23K 1/015 228/234.2 |
| 6,116,497 A | * | 9/2000 | Scheel ............... B23K 1/015 228/234.2 |
| 2001/0030386 A1 | | 10/2001 | Garidel |
| 2007/0057020 A1 | * | 3/2007 | Shibamura ........... B23K 1/008 228/101 |
| 2011/0024484 A1 | * | 2/2011 | Suihkonen ........ H05K 13/0486 228/264 |
| 2013/0200136 A1 | | 8/2013 | Besshi et al. |
| 2019/0314917 A1 | * | 10/2019 | Nagai ............... B23K 1/008 |

FOREIGN PATENT DOCUMENTS

| | | |
|---|---|---|
| JP | 5-050220 | 3/1993 |
| JP | 2001-047223 | 2/2001 |
| WO | 2012/070264 | 5/2012 |

\* cited by examiner

VAPOR-PHASE TYPE HEATING METHOD AND VAPOR-PHASE TYPE HEATING APPARATUS

BACKGROUND

1. Technical Field

The present disclosure relates to a vapor-phase type heating method and a vapor-phase type heating apparatus for heating a heating target object by using latent heat of vaporization of vapor from a heat transfer liquid.

2. Description of the Related Art

In recent years, in an assembly manufacturing process of various industrial products or home electronics or a device manufacturing process of various types of electronic components which become constituent components of the industrial products or the home electronics, various types of batteries, a board on which electronic components are mounted, or the like, a shape of a heating target object, which is processed by various types of heat treatment apparatuses has been complicated. For example, even with the board on which the electronic components are mounted, in a state in which a holding force is weak to the extent that not only a flat board is used but also solder paste is applied on a portion other than a horizontal surface of a three-dimensional board and the electronic components are mounted on the board, heat treatment for melting the solder paste and performing bonding is performed. In addition, the three-dimensional board is used, and thereby heat capacity of the heating target object also tends to increase. Here, examples of the various heat treatment apparatuses include a drying furnace, a cure furnace, a reflow furnace that is used for soldering in a mounting process or the like of an electronic component, or the like.

In heating process of the heating target objects, in a case where there is a variation in temperature rise at positions of the heating target object due to uneven heating performance, it is necessary to further hold the heating target object for a desired time from a state in which all of the portions of the object reach a desired temperature in order to gain a desired necessary time for the heating process, and thus a portion, in which the temperature rise is rapid, is exposed to more heat than necessary in order to hold a portion, in which the temperature rise is slow, for a desired time. In this case, particularly a case where heat has a significant influence, there is concern about an influence on quality. In addition, in a case where a heating process is performed by using heat transfer due to collision of hot air, and the heating target object has a large heat capacity, a collision speed of the hot air to the heating target object is increased in order to obtain a desired rate of temperature rise, and thereby it is possible to increase a heat-transfer coefficient. However, in a case where it is necessary to perform the heating treatment in the state in which the holding force is weak to the extent that the solder paste is applied on the portion other than the horizontal surface of the three-dimensional board and the electronic components are arranged on the board, the collision of the hot air is performed at a high speed before solidification of the solder is completed through melting and then cooling of the solder, and thereby there is a high possibility that the components are likely to fall away from the board. Hence, as a method of avoiding the falling away of the components or the like due to the collision of the hot air even on a board having a large hat capacity and efficiently heating the heating target object by using a high heat-transfer coefficient, as a method of heating an object by using latent heat of vaporization of vapor of a heat transfer liquid, and as a method of randomly setting a rate of temperature rise of a heating target object, there has been known a method disclosed in Japanese Patent Unexamined Publication No. 2-112871.

FIG. 10 is a diagram illustrating a vapor-phase type soldering apparatus in the related art disclosed in Japanese Patent Unexamined Publication No. 2-112871. Japanese Patent Unexamined Publication No. 2-112871 discloses the following configuration. The vapor-phase type soldering apparatus in the related art includes container 101, heater 103, condenser 104, loading mechanism 107, and control mechanism 108.

Container 101 has an opening on an upper portion thereof. Heat transfer liquid 102 is stored in liquid portion 101b on a lower portion of container 101. Heater 103 is provided in liquid portion 101b on the lower portion of container 101 and heats heat transfer liquid 102. Condenser 104 is provided to have a predetermined interval from a top surface of heat transfer liquid 102. Saturated vapor 105 of heat transfer liquid 102 is formed between the top surface of heat transfer liquid 102 and condenser 104. Loading mechanism 107 loads treatment target object 106 from the opening and puts the treatment target object into saturated vapor 105, and control mechanism 108 performs control such that treatment target object 106 is put into the saturated vapor at a speed of lower than 15 mm/sec in a range in which a temperature of treatment target object 106 exceeds 70° C. and rises from 100° C. to 150° C. Here, in the vapor-phase type soldering apparatus in the related art, liquid portion 101b of heat transfer liquid 102 is formed on a bottom portion of vapor tank 101a, heat transfer liquid 102 accommodated in liquid portion 101b is heated by heater 103, thereby vaporizing, and saturated vapor 105 is formed at a temperature at this moment on liquid portion 101b. Treatment target object 106 such as an electronic circuit board on which electronic components are mounted via solder paste is immersed in saturated vapor 105 so as to come into contact with vapor of saturated vapor 105, and thereby saturated vapor 105 having a decreased temperature liquefies to heat transfer liquid 102 and, at this time, latent heat of vaporization of saturated vapor 105 is applied to electronic circuit board 106 such that the electronic circuit board is heated. The temperature of electronic circuit board 106 reaches a soldering temperature due to the heating, and thereby the solder melts and soldering is completed after cooling. At this time, when treatment target object 106 is put into saturated vapor 105 all at once, a heat-transfer coefficient becomes very high due to the latent heat of vaporization, and thus a rate of temperature rise is often too high due to a heat capacity of treatment target object 106. Therefore, in the configuration disclosed in Japanese Patent Unexamined Publication No. 2-112871, in order to realize a desired rate of temperature rise, the treatment target object is put into saturated vapor 105 while the temperature of electronic circuit board 106 is measured, and a putting-in speed is adjusted so as to obtain the desired rate of temperature rise. Finally, the entirety of treatment target object 106 is immersed into saturated vapor 105, and thereby treatment target object 106 is heated until the temperature reaches a boiling point of heat transfer liquid 102.

In addition, there has been known a method disclosed in Japanese Patent Unexamined Publication No. 2-80168 as a method for obtaining an even concentration of saturated vapor 105 of a heat transfer liquid. FIG. 11 is a diagram illustrating Japanese Patent Unexamined Publication No. 2-80168. Japanese Patent Unexamined Publication No. 2-80168 discloses the following configuration. Board 111 having a portion, on which components are disposed, is disposed in vapor 113 of inert liquid 112 having a boiling point equal to or higher than a melting temperature of a welding agent for welding the components and board 111. In a vapor-phase type welding apparatus that heats and melts the welding agent by using latent heat of vaporization of vapor 113 and welds the components and board 111, an agitation device, which generates moderate convection flow to the extent that vapor 113 is not broken, is provided in vapor 113. When the configuration disclosed in Japanese Patent Unexamined Publication No. 2-80168 is employed, the components and board 111 as heating target objects having a height in a direction perpendicular to a liquid level of inert liquid 112 come into substantially even contact with vapor 113.

SUMMARY

An object of the disclosure is to provide a vapor-phase type heating method according to an aspect of supplying, to a heating furnace, vapor formed in a vapor tank by heating a heat transfer liquid, and heating a heating target object by using latent heat of vaporization of the supplied vapor, the method including: collecting, in the vapor tank, the heat transfer liquid which has come into contact with the heating target object, has cooled to liquefy, and has fallen down as droplets from a surface of the heating target object to a lower portion of the heating furnace, after heating the heating target object with heated gas including the vapor by applying latent heat of vaporization of the vapor to the heating target object through phase change in the heating furnace; resupplying, to the heating furnace, heated gas to which the vapor has been supplied and which has been formed by supplying the vapor from the vapor tank to heated gas obtained after heating the heating target object discharged from the heating furnace to a circulation pathway; and heating the heating target object, which is disposed in the heating furnace, at a predetermined rate of temperature rise in a state of an even distribution of the vapor of the heat transfer liquid by maintaining the vapor of the heat transfer liquid in a predetermined amount in the heating furnace by the collection and the supply. In addition, another object of the disclosure is to provide a vapor-phase type heating apparatus according to another aspect, the apparatus including: a vapor supply device that forms a predetermined amount of vapor inside by heating a heat transfer liquid; a heating furnace that holds a heating target object inside and heats the heating target object by using latent heat of vaporization of the vapor by causing heated gas including the vapor formed in the vapor supply device to come into contact with the heating target object; a circulation pathway for resupplying, to the heating furnace, the heated gas including the vapor, after the heated gas obtained by heating the heating target object is discharged from the heating furnace and is mixed with the vapor formed in the vapor supply device; a heating device that is disposed on the circulation pathway and heats the heated gas in the heating furnace; a blast device that is disposed on the circulation pathway and sends the heated gas and the vapor toward the heating furnace; a collecting device that collects the heat transfer liquid in the heating furnace; a controller that controls each of the vapor supply device and the collecting device and adjusts the vapor in the heating furnace to a predetermined amount by controlling an amount of the supply or the collection of the vapor of the heat transfer liquid to and from the circulation pathway; a spray member that is disposed around the heating target object in the heating furnace and evenly sprays the heated gas in the heating furnace to the heating target object; and a reheating device that is disposed on a lower portion of the heating furnace and heats the heat transfer liquid, which liquefies on a surface of the heating target object and falls down as droplets to a side below the heating target object, such that the heat transfer liquid is changed into vapor.

As described above, according to the vapor-phase type heating method and the vapor-phase type heating apparatus of the disclosure, heating the heating target object, which is disposed in the heating furnace, it is possible to heat the heating target object, which is disposed in the heating furnace, at a predetermined rate of temperature rise in a state of an even distribution of the vapor of the heat transfer liquid by maintaining the vapor of the heat transfer liquid in a predetermined amount in the heating furnace by the supply of the vapor from the vapor tank or the vapor supply device and the collection of the heat transfer liquid from the heating furnace. As a result, when the supply and the collection are adjusted, it is possible to increase or decrease to adjust the concentration and to achieve an even concentration of the vapor of the heat transfer liquid that transfers heat to the heating target object, it is possible to increase or decrease the rate of temperature rise, and it is possible to evenly heat a three-dimensional heating target object, also, with even heat transfer without an occurrence of a difference in heating performance depending on a position and a time during the heating of the heating target object.

DETAILED DESCRIPTION

Before an exemplary embodiment is described, problems in the related art are briefly described.

A configuration disclosed in Japanese Patent Unexamined Publication No. 2-112871 has problems in that a variation in temperature of a heating target object is limited in a case like a general electronic circuit board that is configured to have a substantially flat surface in a horizontal direction with respect to a liquid level; however, there is a difference in heating performance due to an influence by a difference in concentration and a difference in temperature of vapor in a height direction, there is a difference in temperature rise at positions of the heating target object, particularly, in a perpendicular direction to the liquid level, and there is likely to be a variation in temperature in a case of a heating target object having a height in the perpendicular direction to the liquid level.

In addition, a configuration disclosed in Japanese Patent Unexamined Publication No. 2-80168 has problems in that it is possible to expect an effect of maintaining a constant vapor concentration in a height direction in vapor in order to obtain an even vapor concentration of a heat transfer liquid in the vapor by an agitating device; however, since the vapor concentration is constant and it is not possible to increase and decrease the vapor concentration, it is not possible to adjust a rate of temperature rise of a heating target object put into the vapor to a predetermined rate of temperature rise.

The disclosure is made to solve the problems of the related art, and an object thereof is to provide a vapor-phase type heating method and a vapor-phase type heating apparatus in which it is possible to increase or decrease to adjust a vapor concentration of a heat transfer liquid around a heating target object and to maintain an even concentration thereof, and there is no difference in heating performance depending on a position and a time during the heating of the heating target object.

Hereinafter, an exemplary embodiment of the disclosure will be described with reference to the figures.

Embodiment

Figure 1:
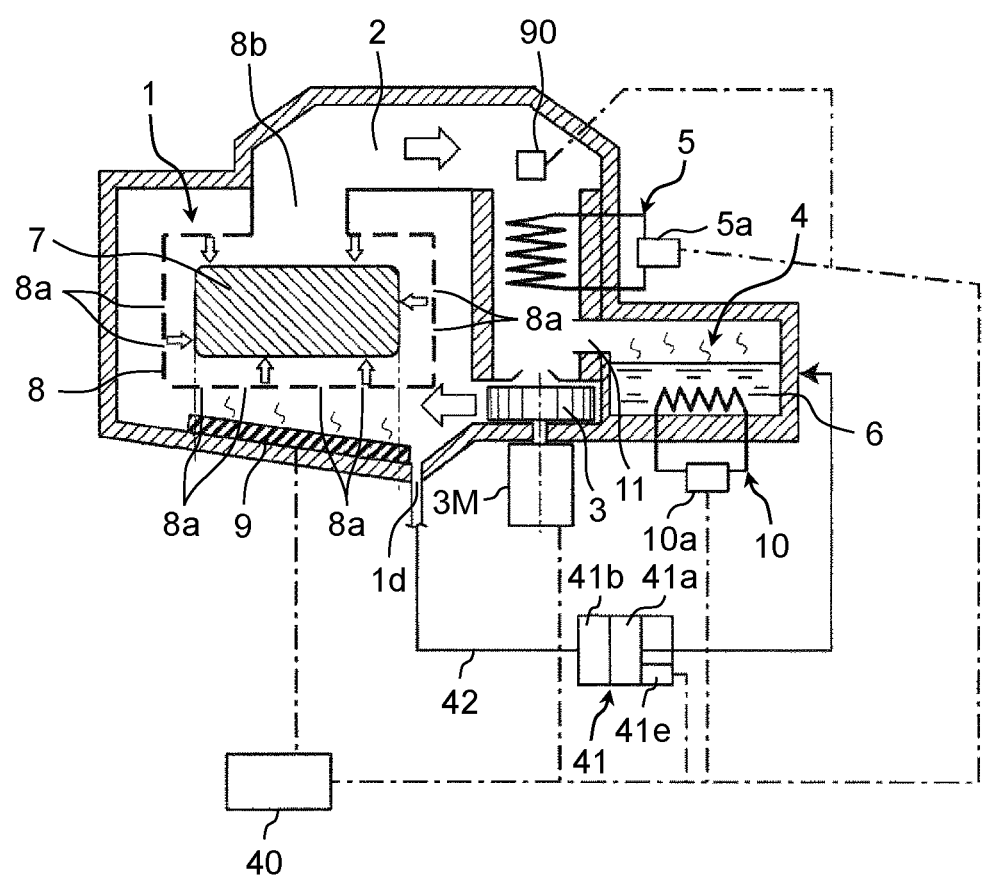
FIG. 1 is a diagram illustrating a vapor-phase type heating apparatus that performs a vapor-phase type heating method in an exemplary embodiment of the disclosure.

FIG. 1 is a diagram illustrating a vapor-phase type heating method in an exemplary embodiment of the disclosure. A vapor-phase type heating apparatus that is capable of performing the vapor-phase type heating method includes heating furnace 1 that performs heating treatment on heating target object 7, circulation duct 2 which communicates with heating furnace 1 and through which heated gas in heating furnace 1 circulates, circulation fan 3 that is disposed in an intermediate portion of circulation duct 2 and forcibly circulates the heated gas in circulation duct 2, and vapor tank 4 that is connected to the intermediate portion of circulation duct 2 and supplies vapor of heat transfer liquid 6 to circulation duct 2. Circulation duct 2 functions as an example of a circulation pathway. Vapor tank 4 functions as an example of a vapor supply device. An example of a heated gas includes the atmosphere, that is, the air, specifically the air including the vapor of the heat transfer liquid. An example of the heat transfer liquid is a fluorinated inert liquid having an electrical insulation property.

For example, heating furnace 1 has a configuration in which housing 8 provided with multiple openings 8a, in which heating target object 7 is accommodated, is disposed in the vicinity of the substantial center in the heating furnace, the heated gas is supplied from a right end portion on a lower portion of heating furnace 1, and heating target object 7 in housing 8 is heated and then is discharged from upper end opening 8b of housing 8 in heating furnace 1. Details of housing 8 will be described below.

One end (for example, an upper end) of circulation duct 2 for circulating the heated gas is connected to a downstream side (for example, an upper end portion of heating furnace 1 in FIG. 1) of heating furnace 1. The other end (for example, a lower end) of circulation duct 2 is connected to an upstream side (for example, the right end portion on the lower portion of heating furnace 1 in FIG. 1) of heating furnace 1. The heated gas is caused to forcibly flow from the one end to the other end of circulation duct 2 by circulation fan 3, and thereby an air current is generated in the heated gas in heating furnace 1 from the upstream side toward the downstream side of heating furnace 1.

In addition, heater 5 is installed in an intermediate portion of circulation duct 2, that is, on the upstream side of circulation fan 3. Heater 5 supplies heat energy to heated gas in heating furnace 1, which flows in circulation duct 2 and has a temperature decreased due to heat transfer to heating target object 7, and the heated gas has a temperature rise to a predetermined temperature. In other words, heater controller 5a is capable of performing heating control of heater 5, a heating temperature as a set temperature for the heated gas is set to the heated gas in heater 5 by heater controller 5a, and the heated gas is heated to the set temperature for the heated gas under control performed by heater controller 5a. In this manner, it is possible to heat heating target object 7 in heating furnace 1 to a predetermined temperature.

Further, vapor is generated in vapor tank 4 of heat transfer liquid 6. Vapor tank 4 is connected to duct connecting portion 11 at an intermediate portion of circulation duct 2. Hence, a part of the entirety of the vapor generated in vapor tank 4 of heat transfer liquid 6 is supplied from vapor tank 4 to circulation duct 2 via duct connecting portion 11, and the vapor is mixed with the heated gas flowing in circulation duct 2. Here, in order to heat or vaporize heat transfer liquid 6, heater 10 for liquid is installed in heat transfer liquid 6 in vapor tank 4. Heater controller 10a is capable of performing heating control of heater 10 for liquid, a heating temperature as a vapor supplying set temperature is set to heat transfer liquid 6 in heater 10 for liquid by heater controller 10a, and heat transfer liquid 6 is heated to the vapor supplying set temperature and is vaporized to generate vapor under control performed by heater controller 10a. In this manner, it is possible to adjust an amount or a concentration of vapor that can be supplied from vapor tank 4 to circulation duct 2.

When the heated gas flowing in circulation duct 2 and the vapor from vapor tank 4 are mixed with each other, the temperature of the heated gas heated in circulation duct 2 by heater 5 is adjusted to a temperature equal to or above a boiling point of heat transfer liquid 6, in order to prevent the vapor of heat transfer liquid 6 supplied into heating furnace 1 from liquefying. The heated gas including the vapor supplied from vapor tank 4 into circulation duct 2 is agitated by circulation fan 3 and is sent at an even vapor concentration from circulation duct 2 into heating furnace 1 in which heating target object 7 is disposed.

Sending of the heated gas into heating furnace 1 by circulation fan 3 is adjusted such that a collision speed of the heated gas heating target object 7 becomes a predetermined speed. In heating furnace 1, the heated gas including the vapor of heat transfer liquid 6 collides with heating target object 7, and thereby heat energy of the heated gas is also transmitted through heat transfer to heating target object 7; however, the vapor included in the heated gas comes into contact with heating target object 7, cools to liquefy, and thereby latent heat of condensation due to a phase change to liquefaction of the vapor is applied to heating target object 7. Therefore, compared to a case of the only collision of the heated gas to heating target object 7, it is possible to highly efficiently achieve the temperature rise of the temperature of heating target object 7 due to a very high heat-transfer coefficient.

Here, in heating furnace 1, heating target object 7 is enclosed by housing 8 provided with multiple fine openings 8a in surface of the housing in heating furnace 1 such that the heated gas including the vapor of heat transfer liquid 6 is caused to come into even contact with heating target object 7, and thereby the heated gas including the vapor of heat transfer liquid 6 is blown to heating target object 7 with substantially even blast speed from fine openings 8a. Housing 8 is configured to have a size larger than that of heating target object 7 and to have any three-dimensional shape such as a rectangular parallelepiped or a circular cylinder shape such that heating target object 7 can be accommodated inside the housing and it is possible to secure a gap between the housing and heating target object 7. An upper end of housing 8 is provided with upper end opening 8b and is connected to the one end of circulation duct 2. Housing 8 functions as an example of a spray member that is disposed around heating target object 7 in heating furnace 1 and substantially evenly sprays the heated gas in heating furnace 1 to heating target object 7.

The vapor comes into contact with heating target object 7 in housing 8 of heating furnace 1, the vapor of heat transfer liquid 6, which is obtained by applying latent heat of vaporization of the vapor to heating target object 7, liquefies on the surface of applied to heating target object 7 through the phase change, and the liquefying liquid falls from the front surface of heating target object 7 as droplets toward the lower portion of heating furnace 1 by passing through openings 8a of housing 8. The heated gas is sent to heating target object 7 at a substantially even blast speed on a bottom surface of housing 8; however, it is necessary not to block fine openings 8a of housing 8 by falling liquefied heat transfer liquid 6 as droplets, at the same time, whereas it is preferable that openings 8a have a diameter of about 3 mm to 5 mm in order to cause the heated gas including the vapor of heat transfer liquid 6 to come into even contact with heating target object 7.

At this time, a part of heat transfer liquid 6 falling as droplets is re-vaporized with energy of the heated gas in heating furnace 1 having a temperature that is set to be equal to or above the boiling point; however, bottom surface heater 9 is installed, in order for heat transfer liquid 6 that has fallen down to the bottom surface of heating furnace 1 to be reheated, to be vaporized, and to be supplied as the vapor in the heated gas in heating furnace 1. Bottom surface heater 9 functions as an example of reheating device. The heating control of bottom surface heater 9 can be performed by controller 40 to be described below; however, another heater controller may be provided and the heating control may be performed.

In this manner, the vapor of heat transfer liquid 6 supplied from vapor tank 4 in a space, in which the heated gas formed by heating furnace 1 and circulation duct 2 circulates, is stably present in heating furnace 1, and a temperature of the heated gas by heater 5 and a concentration of the vapor of heat transfer liquid 6, which is included in the heated gas and is generated in vapor tank 4 due to the heating by heater 10 for liquid, are substantially maintained at a set temperature and a set concentration, respectively. In such a configuration, the heating performance in heating furnace 1 is maintained to be desired performance corresponding to heating target object 7.

At this time, there is a possibility that a part of the vapor will come into contact with a wall surface of heating furnace 1, will liquefy, and cannot be re-vaporized without being guided to bottom surface heater 9. Further, there is a possibility that liquefied heat transfer liquid 6 will remain in a recessed portion of heating target object 7 or will be attached to a wall surface of heating target object 7 as it is, and the heat transfer liquid will be carried out along with heating target object 7 at the time of carrying out of heating target object 7. Therefore, an amount of loss of heat transfer liquid 6 (in other words, an amount of heat transfer liquid 6 collected by collecting device 41) from heating furnace 1 as described above is appropriately added and supplemented from vapor tank 4 into heating furnace 1.

As an example, the addition and supplement of the heat transfer liquid are performed by detecting a change in concentration of the heat transfer liquid included in the heated gas that circulates in heating furnace 1. In a case where the amount of the heat transfer liquid included in the heated gas is changed due to any reason, the concentration of the vapor is changed. A change in concentration of the vapor is detected, and a change in concentration of the heat transfer liquid is detected. Specifically, as vapor concentration detecting device 90 that detects a concentration of the vapor, a device that detects a difference in transmittance by using an infrared ray having a wavelength with a high absorption rate or a device that detects a dew point by sampling a part of the heated gas all the time is considered. According to a result detected by vapor concentration detecting device 90, a predetermined amount of vapor is supplied to the circulation pathway or is discharged from the circulation pathway, and thereby it is possible to perform the addition and the supplement of the amount of heat transfer liquid 6 which is collected by collecting device 41. As an example, vapor concentration detecting device 90 may be disposed on the upstream side of heater 5 of circulation duct 2 in FIG. 1; however, the disposition of the device is not limited thereto, and the vapor concentration detecting device may be disposed at any position in circulation duct 2, in the vicinity of upper end opening 8b of the heating furnace or on the downstream side of heater 5, or the like. Information detected by vapor concentration detecting device 90 is input to controller 40 and is used for control of another device.

In addition, collecting device 41 includes at least pump 41a that supplies, to vapor tank 4, the heat transfer liquid collected and liquefied by being discharged due to its own weight without being re-vaporized. Pump 41a may cause heat transfer liquid 6 falling down as droplets to the bottom surface of heating furnace 1 to be forcibly discharged from heating furnace 1. For example, an amount of the heat transfer liquid that is collected by collecting device 41 can be obtained by directly measuring the amount of the collected heat transfer liquid by flowmeter 41b or the like. Otherwise, it is possible to hold the collected heat transfer liquid in a collecting tank (not illustrated), to measure a position of a liquid level in the collecting tank by a liquid-level meter (not illustrated), and to detect the amount of the collected heat transfer liquid.

In addition, in order to supply the vapor depending on the amount of the collected heat transfer liquid, the supply may be performed as follows, for example. First, a relational table or a relational expression between the amount of the collected heat transfer liquid and a supply amount of the vapor is obtained in advance as relational information and is stored in an internal storage, the supply amount of the vapor depending on the amount of the collected heat transfer liquid is calculated by computation unit 41e of the collecting device, based on the relational information, an amount of heat depending on the calculated supply amount is calculated by computation unit 41e, and the calculated amount of heat is applied to heat transfer liquid 6 from heater 10 for liquid by controller 40.

It is possible to increase or decrease to adjust the heating performance in heating furnace 1 corresponding to heating target object 7, by increasing and decreasing a heating temperature of heater 10 for liquid and increasing and decreasing the amount of the vapor of heat transfer liquid 6 from vapor tank 4, which is included in the heated gas.

For example, when the heating performance is increased, a heating temperature of heater 10 for liquid is increased, the vapor amount of heat transfer liquid 6, which is supplied from vapor tank 4 to circulation duct 2, is increased, and the vapor concentration of heat transfer liquid 6 in the heated gas in heating furnace 1 is increased to a predetermined vapor concentration that is high than a set concentration obtained by this time. In this manner, it is possible to increase the latent heat of vaporization that is given to heating target object 7.

Conversely, in order to decrease the heating performance in heating furnace 1, the heating temperature of heater 10 for liquid is decreased, the vapor comes into contact with heating target object 7 such that heat transfer liquid 6, which liquefies by applying the latent heat of vaporization from the vapor to heating target object 7 and falls down as droplets to the bottom surface of heating furnace 1, is collected without being vaporized, and the vapor amount of heat transfer liquid 6 included in the heated gas is reduced to a desired vapor amount smaller than the set vapor amount. The collection of heat transfer liquid 6 that falls down as droplets to the bottom surface of heating furnace 1 is performed by collecting heat transfer liquid 6 falling as droplets by collecting device 41 on collection flow path 42 from discharge portion 1d of the bottom surface of heating furnace 1, by stopping re-vaporization by bottom surface heater 9, and the heat transfer liquid returns to vapor tank 4 via collection pathway 42.

In this manner, it is possible to reduce the heating performance in heating furnace 1. At this time, in order to further control the vaporization of heat transfer liquid 6, capacity of heater 5 of the heated gas is also decreased, and the temperature of the heated gas is controlled to be equal to or below than the boiling point of heat transfer liquid 6. In this manner, it is possible to further reduce the heating performance with respect to heating target object 7.

In the example, as illustrated in FIG. 1, the controller 40 is provided as necessary. The controller 40 is capable of controlling individually the set temperature of heater 5, a generation amount (concentration) of the vapor by heater 10 for liquid, a rotation speed of motor 3M of circulation fan 3, bottom surface heater 9, or the like. For simplification of the figures, controller 40 or the like is described in only some of figures such as FIG. 1 and is omitted in other figures.

In a vapor-phase type heating method of using the vapor-phase type heating apparatus having the configuration of the exemplary embodiment, when heat transfer liquid 6 is heated such that the vapor formed in vapor tank 4 is supplied to heating furnace 1 via circulation duct 2, and heating target object 7 is heated by using the latent heat of vaporization of the supplied vapor, the following operation is performed as an example.

In heating furnace 1, heating target object 7 is heated with the heated gas including the vapor, the vapor comes into contact with heating target object 7, cools to liquefy, falls down as droplets from a front surface of heating target object 7 to a lower portion of the heating furnace 1, and is collected in vapor tank 4, by applying latent heat of vaporization of the vapor to heating target object 7 through phase change.

In addition, the heated gas obtained after heating target object 7 is heated is discharged from heating furnace 1 to circulation duct 2. In circulation duct 2, the vapor is supplied from vapor tank 4 to the discharged heated gas, and the heated gas including the vapor is supplied to the heating furnace 1.

The collection and the supply are controlled by controller 40, and thereby it is possible to maintain the vapor of heat transfer liquid 6 in a predetermined amount in heating furnace 1 or heating furnace 1 and circulation duct 2, and it is possible to heat heating target object 7, which is disposed in heating furnace 1, at a predetermined rate of temperature rise in a state of an even distribution of the vapor of heat transfer liquid 6.

Figure 2A:
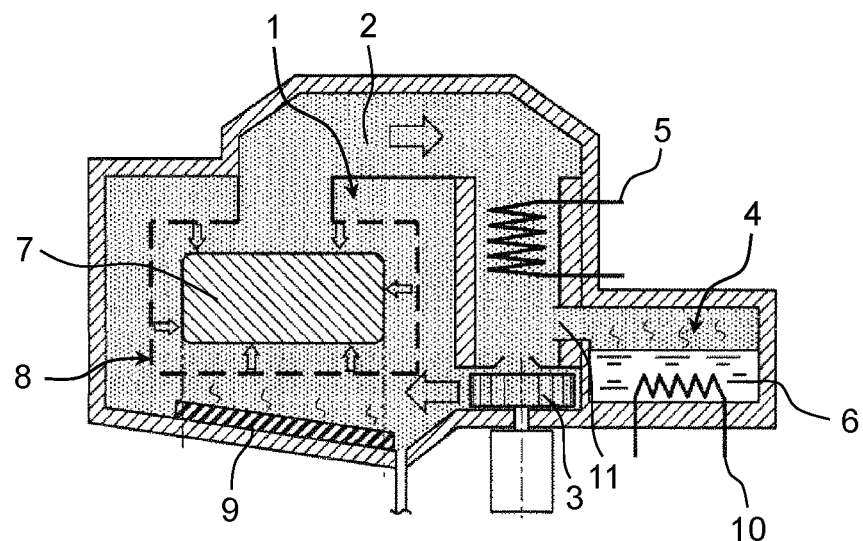
FIG. 2A is a diagram illustrating a state in which a vapor concentration is high in the vapor-phase type heating apparatus in the exemplary embodiment of the disclosure.
Figure 2B:
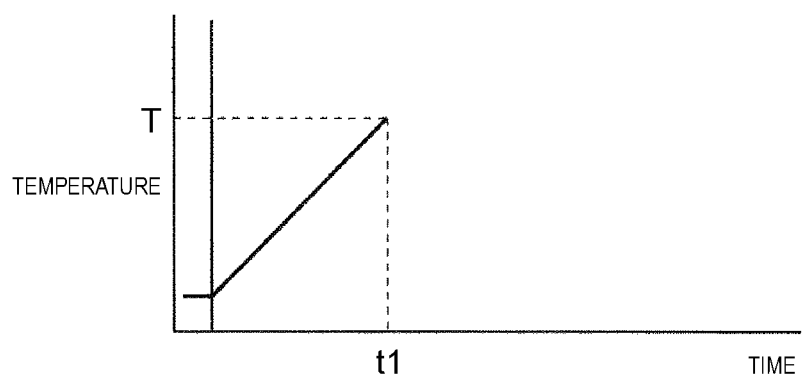
FIG. 2B is a graph illustrating a temperature profile in a configuration in FIG. 2A.
Figure 3A:
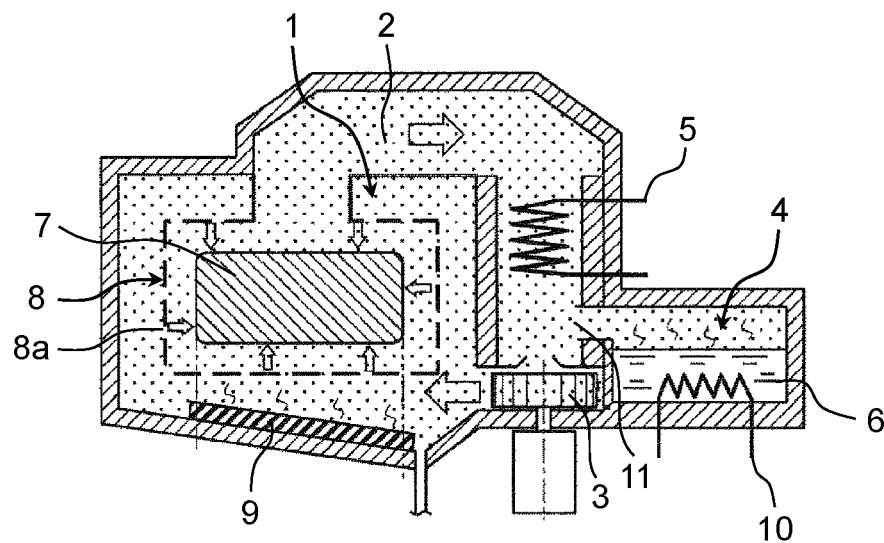
FIG. 3A is a diagram illustrating a state in which a vapor concentration is low in the vapor-phase type heating apparatus in the exemplary embodiment of the disclosure.
Figure 3B:
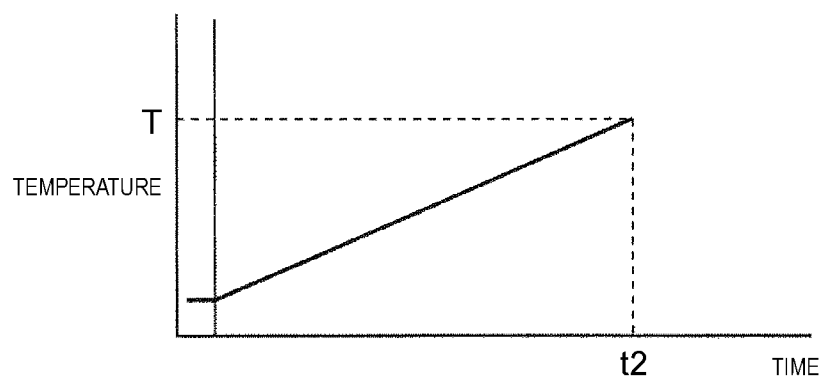
FIG. 3B is a graph illustrating a temperature profile in a configuration in FIG. 3A.

Here, FIGS. 2A and 3A are diagrams illustrating an influence of the vapor concentration of heat transfer liquid 6 in heating furnace 1 by the supply amount of the vapor of heat transfer liquid 6 from vapor tank 4, in the exemplary embodiment of the disclosure. FIG. 2A illustrates a state in which the vapor concentration of heat transfer liquid 6 in the heated gas is high. FIG. 3A illustrates a state in which the vapor concentration of heat transfer liquid 6 in the heated gas is low. An intermediate transition state is present between the states in FIGS. 2A and 3A. In the state in FIG. 2A and the state in FIG. 3A, temperature rise performance is difference from each other in order for the heating performance is different from each other, and rates of temperature rise of heating target objects 7 in both cases are different from each other as illustrated in FIGS. 2B and 3B. However, even in both cases, in the temperature rise by the latent heat of vaporization, the heating target object is not heated to have a temperature equal to or above the boiling point of heat transfer liquid 6. Therefore, the set temperature of the heated gas is set to be slightly above the boiling point, and thereby heating is not performed to a temperature equal to or above the boiling temperature until the temperature of the entire heating target object 7 reaches the boiling point temperature of heat transfer liquid 6. After the temperature of the entire heating target object 7 reaches the boiling point temperature of heat transfer liquid 6, the transition to the temperature rise is performed by the temperature of the heated gas; however, heat-transfer coefficient due to the collision of the hot air is very small, compared to a heat-transfer coefficient due to the latent heat of vaporization. Therefore, there is little possibility of overheating to a higher temperature than necessary. In a case in FIG. 2A, the rate of temperature rise is rapid, and in a case in FIG. 3B, the rate of temperature rise is slow. Therefore, the temperature rises of the temperature profiles are obtained as illustrated in FIGS. 2B and 3B.

Modification Examples

Figure 4A:
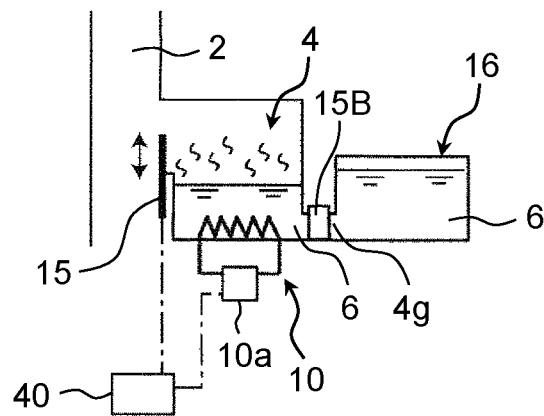
FIG. 4A is a diagram illustrating an adjustment of a vapor concentration of a vapor tank of a vapor-phase type heating apparatus in a first modification example of the exemplary embodiment of the disclosure.
Figure 4B:
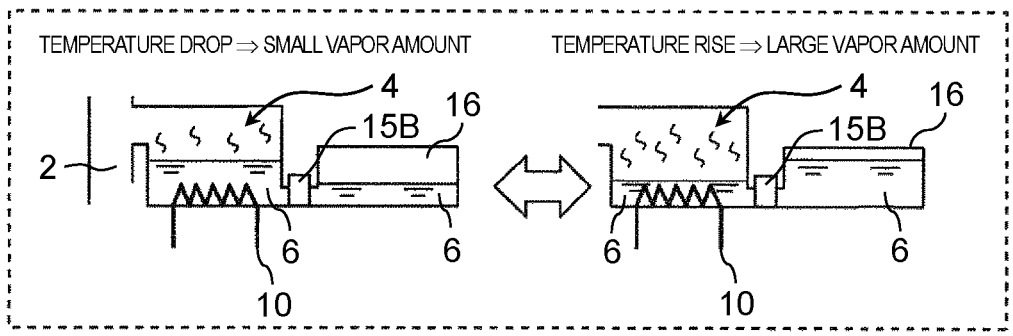
FIG. 4B is a diagram illustrating an adjustment of a vapor concentration of a vapor tank of a vapor-phase type heating apparatus in a second modification example of the exemplary embodiment of the disclosure.
Figure 4C:
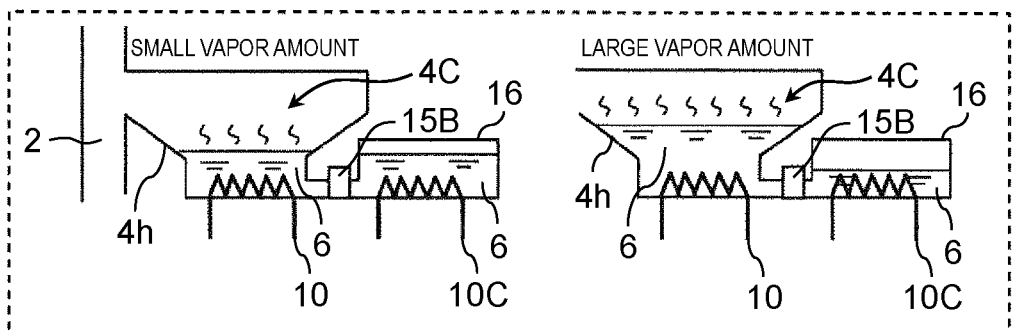
FIG. 4C is a diagram illustrating an adjustment of a vapor concentration of a vapor tank of a vapor-phase type heating apparatus in a third modification example of the exemplary embodiment of the disclosure.

FIGS. 4A, 4B, and 4C illustrate respective diagrams illustrating the vapor-phase method in which heat transfer liquid 6 is different from vapor tank 4 to circulation duct 2 in the first, second, and third modification examples of the exemplary embodiment of the disclosure.

In FIG. 4A in the first modification example, heater 10 for liquid is put into heat transfer liquid 6 such that heat transfer liquid 6 is heated, or heat transfer liquid 6 is heated due to the heat transfer or the like by another heating unit (not illustrated) from the outside of vapor tank 4, and the vapor is generated by vaporizing heat transfer liquid 6. An opening/closing unit such as a shutter 15 is provided on duct connecting portion 11 as an example of the opening for supplying, to heating furnace 1, the vapor generated from heat transfer liquid 6, and controller 40 is capable of controlling the supply amount of the vapor from vapor tank 4 to circulation duct 2 by opening/closing control of the opening/closing unit.

In FIG. 4A, supply tank 16 is disposed to be adjacent to vapor tank 4 and is connected to bottom portion communicating path 4g having pump 15B that is disposed at an intermediate portion of the bottom portion communicating path and is capable of supplying and discharging heat transfer liquid 6, and the supply tank holds heat transfer liquid 6. Drive of pump 15B enables vapor tank 4 to be supplemented with heat transfer liquid 6 from supply tank 16.

In FIG. 4B, in a second modification example, the temperature of heat transfer liquid 6 is changed, and thereby the saturated vapor pressure of the vapor of vapor tank 4 is changed, that is, the vapor amount of the vapor of vapor tank 4 is changed. In this manner, the pump is an example of a unit that changes the supply amount of the vapor of heat transfer liquid 6 from vapor tank 4 to circulation duct 2. A figure on the left in FIG. 4B illustrates a state in which the vapor amount is small due to a temperature drop, and a figure on the right in FIG. 4B illustrates a state in which the vapor amount is large due to a temperature rise. Specifically, the temperature of heat transfer liquid 6 is not changed by only controlling of heater 10 for liquid. In a case where it is necessary to decrease the vapor amount by decreasing the temperature of heat transfer liquid 6 in order to achieve better responsiveness to the change in temperature, heat transfer liquid 6 having relatively lower temperature than that of heat transfer liquid 6 of vapor tank 4 is supplied from supply tank 16 to vapor tank 4, around heater 10 for liquid, the amount of heat transfer liquid 6 of vapor tank 4 is increased, and the temperature is decreased in proportion to the temperature adjustment of heater 10 for liquid. Conversely, in a case where the temperature of heat transfer liquid 6 is increased and the vapor amount is increased, heat transfer liquid 6 around heater 10 for liquid is discharged from vapor tank 4 to supply tank 16, the amount of heat transfer liquid 6 of vapor tank 4 is reduced, and good responsiveness to the change in temperature is obtained due to the amount heat of heater 10 for liquid.

In this manner, it is possible to change the temperature of heat transfer liquid 6 so as to obtain good responsiveness, that is, it is possible to control the saturated vapor pressure and the vapor amount so as to obtain good responsiveness.

In a case where circulation duct 2 and circulation fan 3 are disposed in FIG. 1, since a pressure of duct connecting portion 11, to which vapor tank 4 is connected, becomes negative pressure due to suctioning by circulation fan 3, the vapor of heat transfer liquid 6 generated in vapor tank 4 is suctioned to a side of circulation fan 3 due to the negative pressure and is supplied into circulation duct 2 from vapor tank 4.

In FIG. 4C, in a third modification example, the temperature of heat transfer liquid 6 is in the same state as it is, the shape of a wall surface of a side surface, to which heat transfer liquid 6 on a side of vapor tank 4 is maintained in which the vapor tank is connected to duct connecting portion 11, becomes a taper-shaped inclined surface 4h that is widened upward. The figure on the left in FIG. 4C illustrates a state in which the liquid level of the heat transfer liquid of vapor tank 4 is positioned on the lowest side of inclined surface 4h, and the figure on the right in FIG. 4B illustrates a state in which the liquid level of the heat transfer liquid of vapor tank 4 is positioned on an upper side of inclined surface 4h. In this manner, the amount of heat transfer liquid 6 is reduced such that the position of the liquid level is lifted or lowered, and thereby a surface area of heat transfer liquid 6, in which the vapor generated, is significantly changed, and thus it is possible to control the generation amount of vapor per unit time. At this time, heat transfer liquid 6 is vaporized, and heat transfer liquid 6 is reduced. In this state the liquid level is likely to be lowered and, as a result, the surface area of the liquid level is reduced. Therefore, heat transfer liquid 6 is appropriately and continuously supplied to vapor tank 4 from supply tank 16 by a reduction amount in vapor tank 4, and thereby the height of the liquid level of vapor tank 4 is maintained at a desired height. At this time, the temperature of heat transfer liquid 6 in supply tank 16 is controlled to be the same temperature as that of heat transfer liquid 6 of vapor tank 4 by heater 10C for liquid that is similar to heater 10 for liquid.

Figure 5:
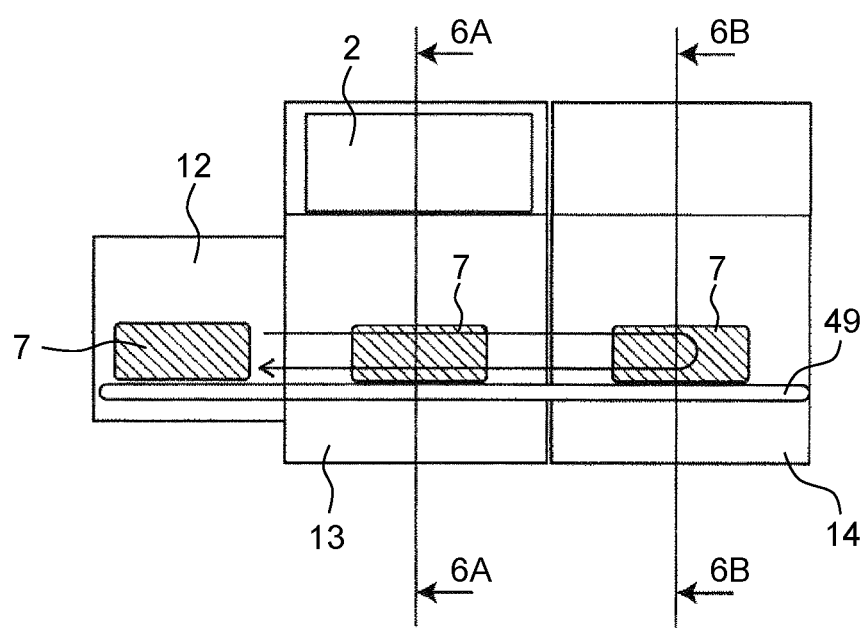
FIG. 5 is a diagram illustrating a vapor-phase type heating apparatus in a fourth modification example of the exemplary embodiment of the disclosure.
Figure 6A:
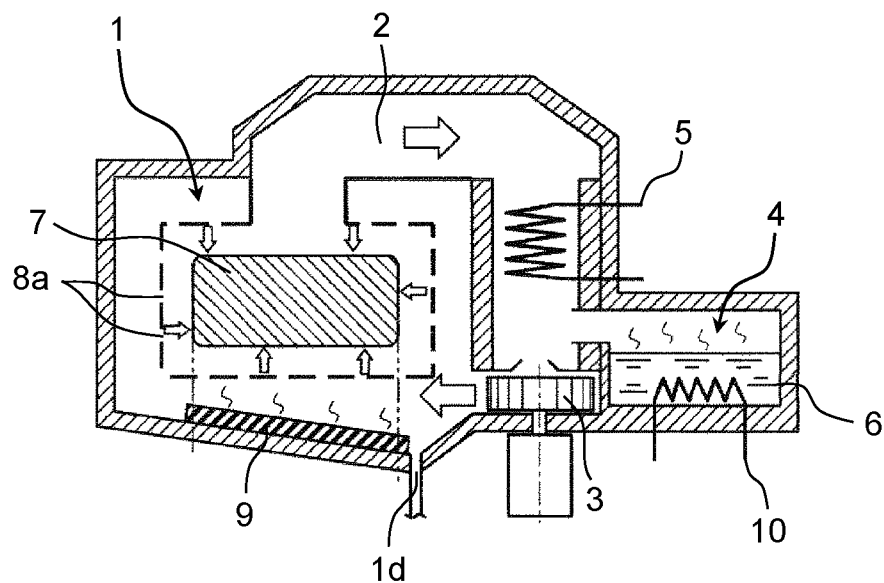
FIG. 6A is a sectional view taken along line 6A-6A of a temperature rise zone of the vapor-phase type heating apparatus in FIG. 5.
Figure 6B:
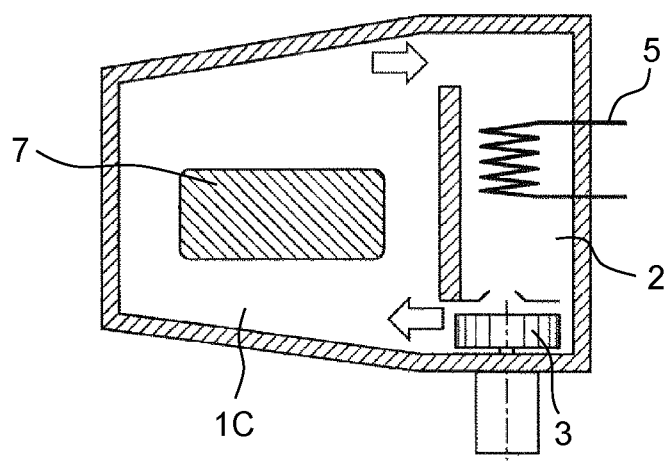
FIG. 6B is a sectional view taken along line 6B-6B of a temperature retaining zone of the vapor-phase type heating apparatus in FIG. 5.

FIG. 5 is a diagram illustrating a vapor-phase type heating apparatus in a fourth modification example of the exemplary embodiment of the disclosure. The vapor-phase type heating apparatus is configured to have standby zone 12, temperature rise zone 13 having one side portion adjacent to standby zone 12, and temperature retaining zone 14 adjacent to the other side portion of temperature rise zone 13 of heating target object 7. FIG. 6A is a sectional view of temperature rise zone 13 in FIG. 5. FIG. 6B is a sectional view of temperature retaining zone 14 in FIG. 5. Transport device 49 like a conveyor belt is disposed over standby zone 12, temperature rise zone 13, and temperature retaining zone 14, and heating target object 7 is transportable between three zones (standby zone 12, temperature rise zone 13, and temperature retaining zone 14). As illustrated in FIG. 6A, temperature rise zone 13 is configured of the vapor-phase type heating apparatus in FIG. 1. As illustrated in FIG. 6B, temperature retaining zone 14 has a configuration in which circulation duct 2, in which heater 5 and circulation fan 3 are disposed, is connected to a lower end and an upper end of temperature retaining chamber 1C, instead of heating furnace 1 in the vapor-phase type heating apparatus in FIG. 1.

Figure 7:
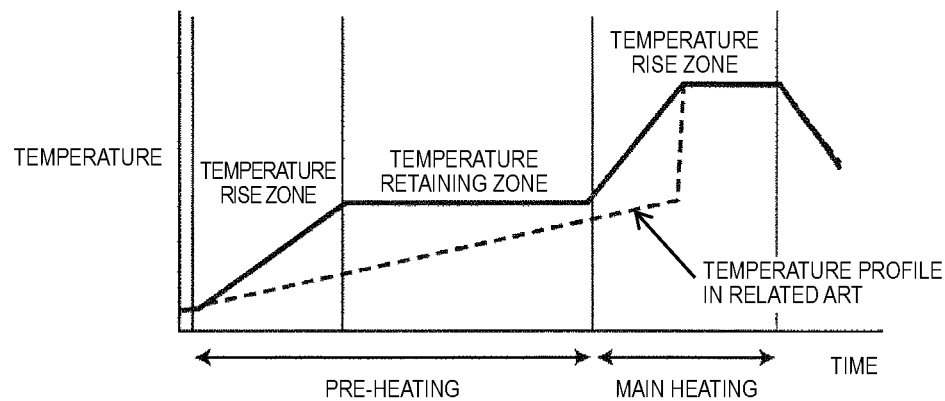
FIG. 7 is a graph illustrating a temperature profile of the vapor-phase type heating apparatus in the fourth modification example of the exemplary embodiment of the disclosure.

The configuration in FIG. 5 is a configuration for reproducing the temperature profile that needs multiple levels such as two more levels of temperatures such as a temperature profile illustrated in FIG. 7.

Heating target object 7 is supplied from standby zone 12 to temperature rise zone 13, and heating target object 7 is heated at a desired rate of temperature rise in temperature rise zone 13.

Subsequently, after heating target object 7 reaches a desired temperature in temperature rise zone 13, heating target object 7 is carried from temperature rise zone 13 to temperature retaining zone 14, and heating target object 7 is held at a constant temperature in temperature retaining zone 14.

Then, after heating target object 7 remains in temperature retaining zone 14 for a desired elapsed time, heating target object 7 is carried from temperature retaining zone 14 again to temperature rise zone 13 and heating target object 7 is heated at the desired rate of temperature rise in temperature rise zone 13.

In a case of a temperature profile that needs two levels of temperature rises, heating target object 7 is unloaded from temperature rise zone 13 to standby zone 12, and a series of heating treatment is completed.

In time retaining zone 14 in FIG. 6B, since heating target object 7 may be held in temperature setting in a temperature retaining condition, there is no need to perform forcible heating, and there is no need to use a heating method in which the heat-transfer coefficient such as the latent heat of vaporization is high. In a case of the fourth modification example of the exemplary embodiment, a configuration of hot air circulation is employed, in which the temperature of the heated gas, which circulates, is maintained to be constant, an air current of the heated gas is generated in temperature retaining chamber 1C by circulation fan 3, and the heated gas is sprayed to heating target object 7 such that the temperature of heating target object 7 is not decreased. At this time, heater 5 for maintaining the temperature of the heated gas at the predetermined temperature is disposed on circulation duct 2.

Figure 8:
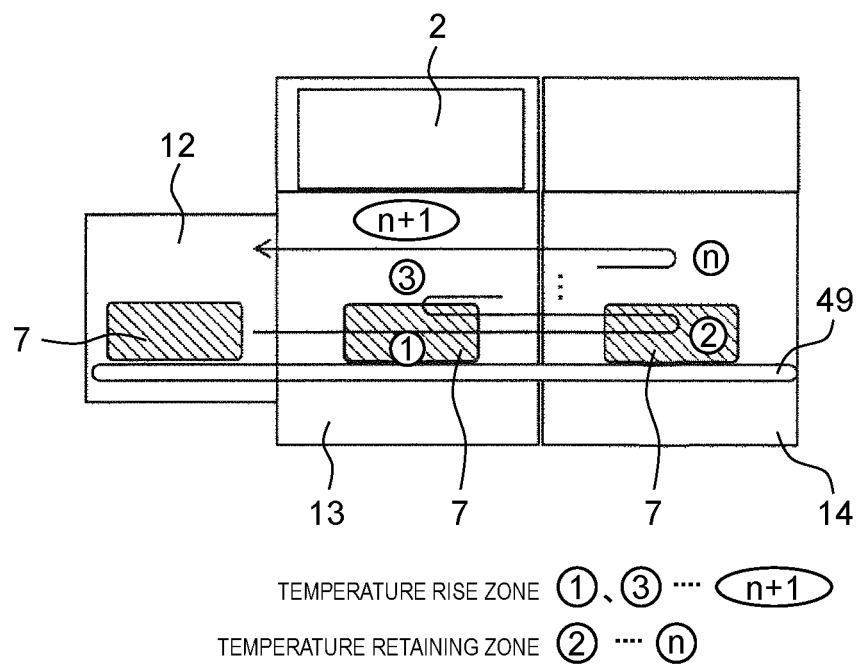
FIG. 8 is a diagram illustrating a vapor-phase type heating apparatus in a fifth modification example of the exemplary embodiment of the disclosure.
Figure 9:
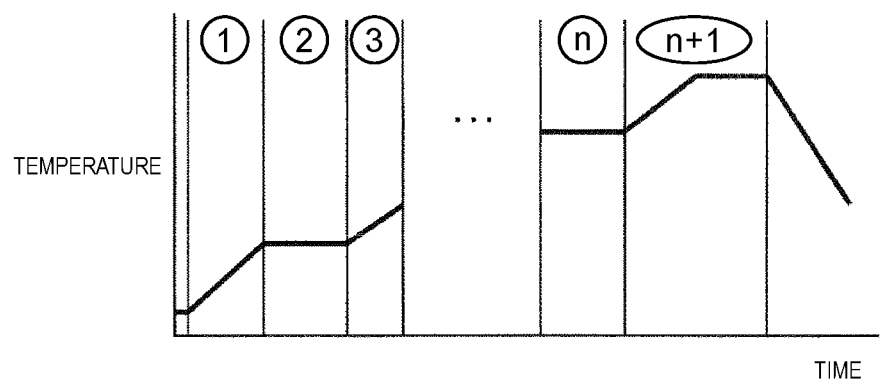
FIG. 9 is a graph illustrating a temperature profile in a configuration of the vapor-phase type heating apparatus in FIG. 8.
Figure 10:
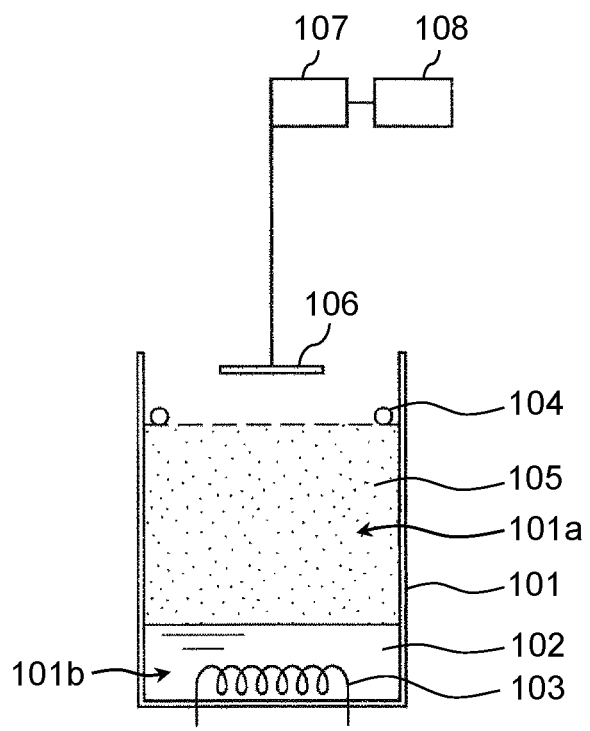
FIG. 10 is a diagram illustrating a vapor-phase type heating apparatus in the related art.
Figure 11:
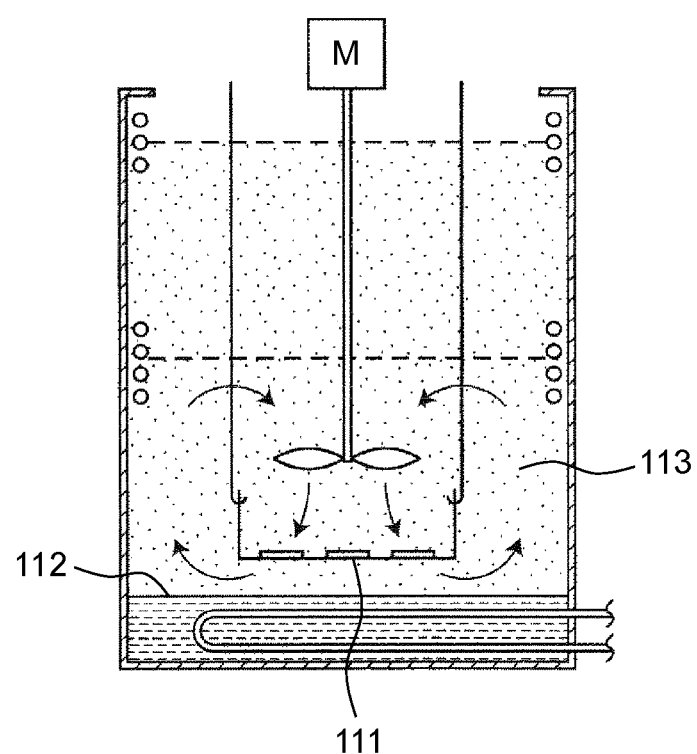
FIG. 11 is a diagram illustrating another vapor-phase type heating apparatus in the related art.

In addition, in a case where multiple levels more than three levels of heating needs to be performed, as described in a fifth modification example of the exemplary embodiment in FIG. 8, after heating target object 7 is heated in temperature rise zone 13, carrying heating target object 7 to temperature retaining zone 14 again is repeatedly performed, and thereby it is possible to perform multiple levels of temperature rise heating as illustrated in FIG. 9. Here, a case where heating in temperature rise zone 13 is performed (n+1) times, and the carrying to temperature retaining zone 14 is performed n times is illustrated.

FIG. 7 is a graph illustrating a temperature profile obtained in a case of reflow soldering in the fifth modification example of the exemplary embodiment of the disclosure, compared to a method in the related art, in order to realize a general temperature profile. A solid line represents a general temperature profile obtained in a case of a reflow furnace that is used for soldering of a board on which electronic components are mounted. A dotted line represents a comparison of a state in which pre-heating is performed by infrared heating or the like in a case of the reflow furnace of a vapor-phase type heating method in the related art, then, a board is put into the vapor of the heat transfer liquid for performing temperature rise to a soldering temperature, the rate of temperature rise is constant, and rapid temperature rise is likely to be performed in many cases. In order to the general temperature profile, the heating is performed in a state in which the vapor concentration of heat transfer liquid 6 is adjusted such that the temperature rise for pre-heating is performed at the desired rate of temperature rise, the board is carried to temperature retaining zone 14 after the temperature reaches a pre-heating temperature, and the board is held at the pre-heating temperature for a predetermined time. Then, the board is again carried to temperature rise zone 13 for main heating, the temperature rise is again started, and the boiling point of heat transfer liquid 6 is set as a predetermined peak temperature of the board. As described above, the temperature of the board also rises to the boiling point of heat transfer liquid 6 and is maintained as it is. Then, the board is held at the peak temperature for a predetermined time, the solder is sufficiently melted, wetted, and spread, and then the board is unloaded to standby zone 12. As described above, it is possible to realize the desired temperature profile.

According to the exemplary embodiment, it is possible to heat heating target object 7, which is disposed in heating furnace 1, at the predetermined rate of temperature rise in a state of the even distribution of the vapor of heat transfer liquid 6 by maintaining the vapor of heat transfer liquid 6 in the predetermined amount in heating furnace 1 by the supply of the vapor from vapor tank 4 and the collection of heat transfer liquid 6 from heating furnace 1. As a result, when the supply and the collection are adjusted, it is possible to increase or decrease the concentration and to achieve an even concentration of the vapor of heat transfer liquid 6 that transfers heat to heating target object 7, it is possible to increase or decrease the rate of temperature rise, and it is possible to evenly heat three-dimensional heating target object 7, also, with even heat transfer without the occurrence of a difference in heating performance depending on a position and a time during the heating of heating target object 7.

When even heating of heating target object 7 is considered, it is advantageous when a circulation air volume (air speed) is as high as possible; however, collision air speed at which damage to the component occurs is different depending on a shape of a component or a mounting method. Therefore, it is difficult to set the air speed uniformly; however, the collision air speed to heating target object 7 can be about 1 m/sec at the maximum. The peak temperature setting depends on the boiling point of the heat transfer liquid, and the temperature is often changed in each case or depending on a case of a temperature adjustment or the like in the vicinity of the temperature of the boiling point thereof when control is further performed to have a predetermined saturated vapor pressure. However, it is possible to assume a set width of (about ½ of the boiling point) to (about 10° C. plus the boiling point) of the heat transfer liquid.

It is possible to achieve the effects of embodiments or modification examples by appropriately combining the exemplary embodiments or the modification examples of various embodiments or modification examples. In addition, it is possible to combine the exemplary embodiments with each other, to combine the examples with each other, or to combine the exemplary embodiments and the examples with each other, and it is possible to combine features with each other in different embodiments or examples.

The vapor-phase type heating method and the vapor-phase type heating apparatus according to the aspects of the disclosure, it is possible to increase or decrease to adjust the concentration and to achieve an even concentration of the vapor of the heat transfer liquid that transfers heat to the heating target object, it is possible to increase or decrease the rate of temperature rise, and it is possible to heat a heating target object having a three-dimensional shape, also, with even heat transfer without an occurrence of a difference in heating performance depending on a position and a time during the heating of the heating target object. Therefore, the aspects of the disclosure are heating method and apparatus of uniformly heating a three-dimensional heating target object and can be applied to heating treatment method and apparatus of performing various types of heating treatment, such as a drying furnace, a cure furnace, or a reflow furnace in a manufacturing process of an industrial product or a home appliance product.

What is claimed is:

1. A vapor-phase type heating method of supplying, to a heating furnace, vapor formed in a vapor tank by heating a heat transfer liquid, and heating a heating target object by using latent heat of vaporization of the supplied vapor, the method comprising:
collecting, in the vapor tank, the heat transfer liquid which has come into contact with the heating target object, has cooled to liquefy, and has fallen down as droplets from a surface of the heating target object to a lower portion of the heating furnace, after the heating target object is heated with heated gas including the vapor by applying latent heat of vaporization of the vapor to the heating target object through phase change in the heating furnace;
resupplying, to the heating furnace,
1) heated gas which has been formed by supplying and mixing a part or entirety of the vapor of the heat transfer liquid generated at the vapor tank from the vapor tank,
to 2) heated gas obtained after heating the heating target object discharged from the heating furnace to a circulation pathway, one end of the circulation pathway being connected to a downstream side of the heating furnace and other end of the circulation pathway being connected to an upstream side of the heating furnace, and the vapor tank being connected to the circulation pathway at a connecting portion; and
heating the heating target object, which is disposed in the heating furnace, at a predetermined rate of temperature rise in a state of an even distribution of the vapor of the heat transfer liquid by maintaining the vapor of the heat transfer liquid in a predetermined amount in the heating furnace by the collection and the supply.

2. The vapor-phase type heating method of claim 1, wherein an amount of the vapor of the heat transfer liquid is adjusted by opening and closing an opening between the circulation pathway and the vapor tank.

3. The vapor-phase type heating method of claim 1, wherein an amount of the vapor of the heat transfer liquid is adjusted, based on a heating temperature of the heat transfer liquid in the vapor tank.

4. The vapor-phase type heating method of claim 2, wherein the amount of the vapor of the heat transfer liquid is adjusted, based on a heating temperature of the heat transfer liquid in the vapor tank.

5. The vapor-phase type heating method of claim 1, wherein an amount of the vapor of the heat transfer liquid is adjusted based on a size of a surface area of the heat transfer liquid in the vapor tank, the vapor being generated on the surface area.

6. The vapor-phase type heating method of claim 2, wherein the amount of the vapor of the heat transfer liquid is adjusted, based on a size of a surface area of the heat transfer liquid in the vapor tank, the vapor being generated on the surface area.

7. The vapor-phase type heating method of claim 1, further comprising:
changing liquefied heat transfer liquid into vapor in the heating furnace by heating, by a re-heating device disposed in the heating furnace, the heat transfer liquid liquefied when heated gas including the vapor of the heat transfer liquid comes into contact with the heating target object disposed in the heating furnace and the latent heat of vaporization of the vapor is applied to the heating target object.

8. A vapor-phase type heating apparatus comprising:
a vapor supply device that forms a predetermined amount of vapor inside by heating a heat transfer liquid;
a heating furnace that holds a heating target object inside and heats the heating target object by using latent heat of vaporization of the vapor by causing heated gas including the vapor formed in the vapor supply device to come into contact with the heating target object;
a circulation pathway for resupplying, to the heating furnace, the heated gas including the vapor, after the heated gas obtained by heating the heating target object is discharged from the heating furnace and is mixed with the vapor formed in the vapor supply device;
a heating device that is disposed on the circulation pathway and heats the heated gas in the heating furnace;
a circulation device that is disposed on the circulation pathway and sends the heated gas and the vapor toward the heating furnace;
a collecting device that collects the heat transfer liquid in the heating furnace;
a controller that controls each of the vapor supply device and the collecting device and adjusts the vapor in the heating furnace to a predetermined amount by controlling an amount of the supply or the collection of the vapor of the heat transfer liquid to and from the circulation pathway;
a spray member that is disposed around the heating target object in the heating furnace and evenly sprays the heated gas in the heating furnace to the heating target object, the spray member being configured by a housing having multiple openings on each surface of the housing; and
a reheating device that is disposed on a lower portion of the heating furnace and heats the heat transfer liquid into vapor, the heat transfer liquid having been liquefied on a surface of the heating target object and fallen down as droplets.

* * * * *